US012713227B2

(12) United States Patent
Hegde et al.

(10) Patent No.: US 12,713,227 B2
(45) Date of Patent: Aug. 18, 2026

(54) SYSTEMS AND METHODS FOR MANAGING CONNECTIONS BETWEEN USER DEVICES AND NETWORKS

(71) Applicant: Comcast Cable Communications, LLC, Philadelphia, PA (US)

(72) Inventors: Raghavendra Hegde, Wayne, PA (US); Saravanan Muthusamy, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 385 days.

(21) Appl. No.: 18/160,006

(22) Filed: Jan. 26, 2023

(65) Prior Publication Data

US 2024/0259783 A1 Aug. 1, 2024

(51) Int. Cl.
*H04W 8/20* (2009.01)
*H04W 8/22* (2009.01)
*H04W 12/71* (2021.01)
*H04W 12/72* (2021.01)

(52) U.S. Cl.
CPC .............. *H04W 8/22* (2013.01); *H04W 12/71* (2021.01); *H04W 12/72* (2021.01)

(58) Field of Classification Search
CPC ........ H04W 8/20; H04W 8/205; H04W 12/45
See application file for complete search history.

(56) References Cited

U.S. PATENT DOCUMENTS

| | | | | |
|---|---|---|---|---|
| 2012/0149373 A1* | 6/2012 | Tian | H04W 36/385 455/436 |
| 2012/0309374 A1* | 12/2012 | Tagg | H04W 12/40 455/418 |
| 2015/0011202 A1* | 1/2015 | Guo | H04L 41/0823 455/418 |
| 2017/0311241 A1* | 10/2017 | Russell | H04W 48/17 |
| 2020/0314635 A1* | 10/2020 | Park | H04W 8/245 |
| 2021/0235257 A1* | 7/2021 | Jiang | H04W 8/183 |
| 2023/0199474 A1* | 6/2023 | Qidwai | H04W 60/005 455/558 |

* cited by examiner

*Primary Examiner* — Barry W Taylor
(74) *Attorney, Agent, or Firm* — BakerHostetler

(57) ABSTRACT

Methods and systems for establishing connections between user devices and a network are disclosed. A service identifier associated with a service entity may be determined. The service identifier may be determined by a user device and based on accessing a subscriber identity module (SIM) card associated with the user device. One or more configuration parameters associated with a communication service of the service entity may be determined based on the service identifier. A connection may be caused to be established between the user device and a network associated with the service entity based at least on the one or more configuration parameters.

18 Claims, 8 Drawing Sheets

SYSTEMS AND METHODS FOR MANAGING CONNECTIONS BETWEEN USER DEVICES AND NETWORKS

BACKGROUND

User devices, such as mobile devices or cell phones, may comprise a subscriber identity module (SIM) card. The SIM card may store mobile subscription related information. The mobile subscription related information may comprise a subscriber identifier (e.g., an international mobile subscriber identity (IMSI)). A user device may use the IMSI to connect to a network (e.g., mobile network, cellular network). However, some user devices may become unable to connect to the network using only the IMSI, such as when changes are made to a network. Therefore, improvements in connection establishment techniques are desirable.

SUMMARY

Methods and systems for establishing connections between user devices and a network are disclosed. When a user subscribes to a network service, such as a cellular communication network, the user may receive a subscriber identity module (SIM) card associated with a service entity (e.g., carrier, mobile carrier) managing the cellular communication network. The SIM cards associated with a service entity may store a service identifier and a subscriber identifier (e.g., an international mobile subscriber identity (IMSI)). The same service identifier may be stored on all of the SIM cards associated with the service entity regardless of the IMSI stored on the SIM card. If one of the SIM cards is installed in (e.g., inserted into, initialized, stored by) a user device, the user device may use the service identifier to load a profile associated with the service entity. The profile may comprise configuration parameter(s) that the user device may use to connect to a network associated with the service entity. Thus, even a user device that is unable to use the IMSI to load the profile associated with the service entity may still be able to connect to the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
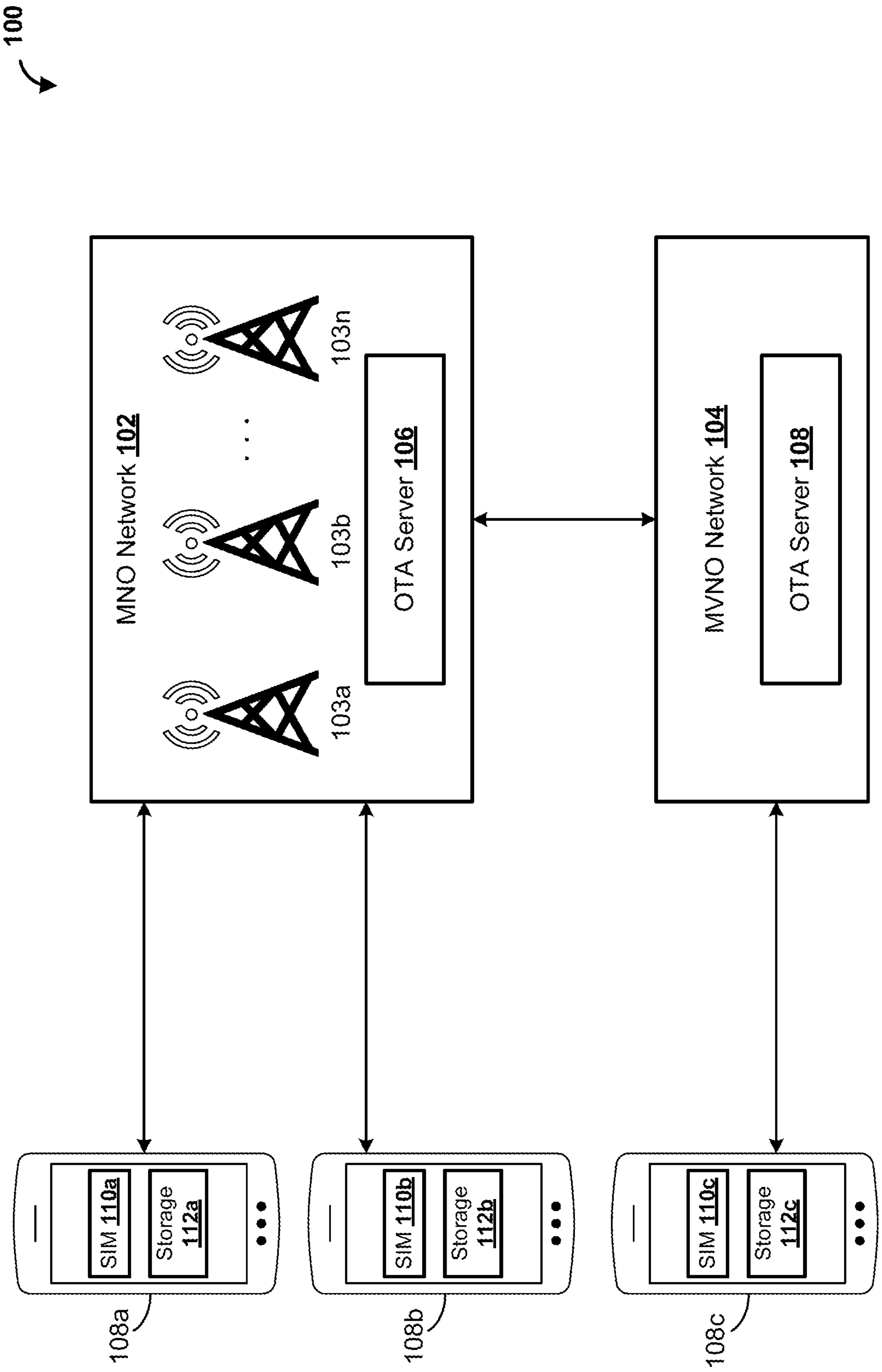
FIG. 1 shows a block diagram of an example system.

Methods and systems for establishing connections between user devices and a network are disclosed. When a user subscribes to a network service, such as a cellular communication network, the user may receive mobile subscription related information from a service entity (e.g., carrier, mobile carrier) managing the cellular communication network. The mobile subscription related information may be in the form of a subscriber identity module (SIM) card (e.g., digital SIM card or physical SIM card). The service entity may be associated with a profile. The profile may comprise configuration parameters that a user device (e.g., a mobile user device, mobile equipment, mobile phone, cell phone, etc.) may utilize when establishing a connection to the cellular communication network. Instead of using a subscriber identifier (e.g., an international mobile subscriber identifier (IMSI)) stored on the SIM card to load the profile, the disclosed techniques may comprise using a service identifier (e.g., carrier ID) stored on the SIM card to load the profile. Though the term IMSI is used in the following description, it is understood that any other subscriber identifier may be used. The service identifier may be globally unique to the service entity (e.g., each service entity has its own unique global service identifier). If the service identifier associated with the service entity is globally unique to the service entity, this may indicate that no other service entity in existence across the world is associated with that same service identifier.

A SIM card may store a card identifier (e.g., an integrated circuit card identifier (ICCID)), an IMSI, a group identifier (GID), security authentication and ciphering information, and/or a set of service-specific parameters. The SIM card may be associated with a particular mobile network operator (MNO) (e.g., Verizon Wireless) or a particular mobile virtual network operator (MVNO) (e.g., Xfinity Mobile). As used herein, the terms “service entity,” “carrier,” or “mobile carrier” may refer to either an MNO or an MVNO. If a user associated with the user device subscribes to (e.g., is a customer of) an MNO for wireless communication services, the SIM card in the user device may be associated with that MNO. If the user associated with the user device instead subscribes to an MVNO for wireless communication services, the SIM card in the user device may be associated with that MVNO. The MVNO may utilize a network of an MNO to provide such wireless communication services to its customers.

The IMSI may comprise a 15-digit number. The first 3 digits of the 15-digit number may represent the mobile country code (MCC). The MCC may be followed by the mobile network code (MNC). The MNC may comprise either 2-digits according to the European standard or 3-digits according to the North American standard. The remaining digits of the 15-digit number may represent the mobile subscription identification number (MSIN) within the MNO or MVNO’s subscription base. The MSIN may comprise 9 or 10 digits, depending on the length of the MNC. If a SIM card has an IMSI of 311480123456789 and a GID of BA01450000000000, the MCC may be 311, the MNC may be 480, and the MSIN may be 123456789. The MCC of 311 may indicate the United States as the country. The MNC of 480 may indicate that the MNO is Verizon Wireless. The GID may identify the MVNO Xfinity Mobile on the Verizon Wireless network.

The user device may read the IMSI and the GID values stored in the SIM card installed in the user device. The user device may derive an MCC value and MNC value from the IMSI. The user device may identify the MNO and/or MVNO associated with the SIM card using the MCC value, the MNC value, and/or the GID value. The user device may load a profile associated with the identified MNO and/or MVNO based on the MCC value, the MNC value, and/or the GID value. The profile may be stored on the user device. The profile may comprise one or more configuration parameters that the user device may utilize when establishing a connection to the network operated by the MNO. The configuration parameter(s) may comprise mobile applications to be loaded, cellular settings like access point name (APN), the name of the MNO and/or MVNO, etc. The configuration parameter(s) may be burnt into the software that is running on the user device.

For every MCC-MNC combination (e.g., 311480), an MNO may distribute up to a predetermined quantity (e.g., 1 billion) of unique IMSIs. If the IMSIs with a specific MCC-MNC combination are exhausted, the MNO may begin generating IMSIs with the next MCC-MNC combination (e.g., 311481) that is allocated by regulatory bodies. In order for user devices to accept the IMSIs with the new MCC-MNC combination, the MNO must work with the user device manufacturers (OEMs). The OEMs may update the software running on newly manufactured user devices to include the new MCC-MNC combination. When a SIM card with the new MCC-MNC combination is installed in (e.g., inserted into) a user device with upgraded software, the user device can correctly load the profile comprising the configuration parameters based on the new MCC-MNC combination. The user device may utilize the configuration parameters to establish a connection to the network operated by the MNO.

However, the OEMs often update the software running on newly manufactured user devices to include the new MCC-MNC combination without any plan to patch the older software versions that are present on the user devices that are already in use (e.g., existing user devices). While the OEMs may push a software upgrade to existing user devices (e.g., user devices already in use), some existing user devices may not be compatible with the newer software version. Additionally, or alternatively, the users of some existing user devices may not wish to upgrade the software on their respective user devices. Additionally, or alternatively, some existing user devices may not have enough remaining storage capacity to perform the software upgrade.

If a SIM card with an IMSI that uses the new MCC-MNC combination is installed in a user device without upgraded software, the user device may not be able to load or identify the profile comprising the configuration parameters based on the new MCC-MNC combination. The user device may thus be able to utilize the configuration parameters to establish a connection to the network operated by the MNO. Currently, there is no way for a user of an existing user device to update the allowed MCC-MNC list stored on the user device without upgrading the software on the user device. Thus, improved techniques for establishing connections between user devices and a network are desirable.

A service identifier (e.g., carrier ID) associated with a service entity (e.g., carrier, mobile carrier) may be stored on the SIM cards of the service entity. The service identifier may be globally unique to the service entity (e.g., each service entity has its own unique global service identifier). If the service identifier is globally unique to the service entity, this may indicate that no other service entity in existence across the world is associated with the same service identifier. The service identifier may be stored in a new file on the SIM card. The new file may be a dedicated file associated with the service identifier. The SIM card may still store the ICCID, the IMSI, and/or the GID. However, the ICCID, the IMSI, and/or the GID may be stored in one or more different files than the service identifier. All of the SIM cards associated with a service entity may store the service identifier associated with the service entity irrespective of the MCC-MNC combination(s) present in the IMSI.

The software running on user devices may be configured to store (e.g., index) profiles comprising configuration parameters based on service identifier, instead of based on MCC-MNC combination. A user device may determine (e.g., read) the service identifier from the STM card. The user device may load a profile corresponding to the service identifier. The profile may comprise one or more configuration parameters associated with a communication service (e.g., wireless communication service) provided by the service entity associated with the service identifier. The user device may utilize the configuration parameter(s) to cause a connection to be established between the user device and a network associated with the service entity. This approach may provide MNOs with the flexibility to introduce IMSIs with new MNC-MCC combinations without the user device software needing to be upgraded.

FIG. 1 shows a block diagram of an example system 100. The system 100 may comprise a first network 102, a second network 104, and plurality of user devices 108*a-c*. The user devices 108*a-c* may comprise any of a variety of different types of mobile devices, including for example, a smartphone, a tablet computer, a laptop computer, a notebook computer, a personal computer, a personal digital assistant (PDA), a user equipment (UE), a mobile station, a fixed or mobile subscriber unit, a pager, a wireless sensor, other consumer electronics, and the like. It should be noted that while the singular term device is used herein, it is contemplated that some devices may be implemented as a single device or a plurality of devices (e.g., via load balancing). Any device disclosed herein may be implemented using one or more computing nodes, such as virtual machines, executed on a single device and/or multiple devices.

The first network 102 may comprise a network (e.g., mobile network, cellular network) associated with an MNO (e.g., Verizon, Sprint, T-Mobile, AT&T, etc.) The first network 102 may comprise a Radio Access Network (RAN) and a core network, which may be used to pass on call services (such as outgoing calls, incoming calls, etc.). The first network 102 may comprise an infrastructure configured to provide wireless communications to customers (e.g., subscribers). The infrastructure may comprise one or more base stations 103*a-n*. The base station(s) 103*a-n* may comprise a base transceiver station (BTS), a Node-B, an eNode-B, and/or any other network device configured to provide a wireless interface to the first network 102. The base station(s) 103*a-n* may be part of a radio access network that may include other base stations and network elements (not shown). The base station(s) 103*a-n* may be configured to transmit and receive wireless signals on one or more carrier frequencies. The base station(s) 103*a-n* may also be referred to as cell(s) of the first network 102. The base station(s) 103 may provide wireless communications over a particular geographic area (e.g., coverage area).

One or more users may establish service with the first network 102 for corresponding user devices 108*a-b*. As used herein, the user(s) associated with the user devices 108*a-b* may be referred to as "customers of" or "subscribers to" the MNO associated with the first network 102. The MNO may provide services (e.g., telecommunications services) to its customers. The user devices 108*a-b* may be provisioned by the MNO with one or more credentials that enable the user devices 108*a-b* to connect to and authenticate with the first network 102 in order to use the communications services of the first network 102. One of these credentials may comprise an identifier, such as, for example, a telephone number (TN) provisioned by the MNO. Although just two user devices 108*a-b* are illustrated in FIG. 1 as being connected to the first network 102, any number of user devices 108*a-b* may access the first network 102 at a given time.

The user devices 108*a-b* and the base station(s) 103*a-n* may communicate over an air interface using any of a variety of suitable wireless communication technologies including, for example, radio frequency (RF), microwave, centimeter wave, infrared (IR), visible light, or the like. The user devices 108*a-b* and the base station(s) 103*a-n* may implement any of a variety of cellular-based radio access technologies, such as, for example, Code Division Multiple Access (CDMA), High-Speed Packet Access (HSPA), Long Term Evolution (LTE), LTE-Advanced (LTE-A), LTE-Advanced Pro (LTE-A Pro), New Radio (e.g., 5G), or the like.

The second network 104 may comprise a network associated with an MVNO (e.g., Xfinity Mobile, etc.). The MVNO may comprise a wireless communications services provider that does not own the wireless network infrastructure over which it provides services to its customers. The MVNO may utilize the infrastructure provided by an MNO to provide services to the MVNO customers. For example, the second network 104 may utilize the infrastructure (e.g., the base stations 103*a-n*, etc.) of the first network 102 to provide services to its customers. The second network 104 may communicate with the first network 102 directly. Additionally, or alternatively, the second network 104 may communicate with the first network 102 through a Mobile Network Operator Enabler (MVNE), such as Arterra.

One or more users may purchase a user device (e.g., user device 108*c*) and establish service with the second network 102. As used herein, the user(s) associated with the user device 108*c* may be referred to as "customers of" or "subscribers to" the MVNO associated with the second network 104. The MVNO may provide services (e.g., telecommunications services) to its customers utilizing the first network 102. The user device 108*c* may be provisioned by the MVNO with one or more credentials that enable the user device 108*c* to connect to the second network 104. Based on connecting to the second network 104, the second network 104 may connect the user device 108*c* to the first network 102 in order to use the communications services of the first network 102. One of these credentials may comprise an identifier, such as, for example, a TN provisioned by the MVNO. Although just one user device 108*c* is illustrated in FIG. 1 as being connected to the second network 104, any number of user devices may access the second network 104 at a given time.

The user devices 108*a-c* may each comprise one of SIM cards 110*a-c*. The SIM cards 110*a-c* may comprise a digital SIM card (e.g., embedded-SIM (eSIM)) or a physical SIM card inserted into the user device. Each of the SIM cards 110*a-c* may store credentials (e.g., mobile subscription related information) associated with the corresponding service entity. The user devices 108*a-b* may comprise SIM cards 110*a-b* that store credentials associated with the first network 102. The credentials associated with the first network 102 may comprise an ICCID. The credentials associated with the first network 102 may comprise an IMSI. The IMSI may uniquely identify the user devices 108*a-b* to the first network 102 and/or identify the first network 102 to the user devices 108*a-b*. The credentials associated with the first network 102 may comprise cryptographic keys needed for authentication and access to the first network 102 via the base station(s) 103*a-n*.

The user device 108*c* may comprise a SIM card 110*c* that stores credentials associated with the second network 104. The credentials associated with the second network 104 may comprise an ICCID. The credentials associated with the second network 104 may comprise an IMSI. The IMSI may uniquely identify the user device 108*c* to the MVO network 102 and/or identify the first network 102 and/or second network 104 to the user device 108*c*. The credentials associated with the second network 104 may comprise a GID that uniquely identifies the second network 104 within the first network 102. The credentials associated with the second network 104 may comprise cryptographic keys needed for authentication and access to the first network 102 via the base station(s) 103*a-n*.

The credentials stored on the user devices 108*a-c* may comprise a service identifier associated with the corresponding service entity. The SIM cards 110*a-b* may store a service identifier associated with the first network 102. The SIM card 110*c* may store a service identifier associated with the second network 104. The service identifier may be globally unique to the service entity. The service identifier stored on one of SIM cards 110*a-c* may be different than the IMSI stored on that SIM card. The service identifier may be stored in a new file (e.g., first file) on the SIM cards 110*a-c*. The first file may be a dedicated file associated with the service identifier. None of the other credentials stored on the SIM cards 110*a-c* may be stored in the first file. The IMSI may be stored in a second file on the SIM cards 110*a-c*. The ICCID may be stored in a third file on the SIM cards 110*a-c*. Other credentials may be stored in different files on the SIM cards 110*a-c*.

The service identifier may comprise any quantity of numbers, letters, phrases, words, or a combination thereof, arranged in any format. The service identifier may comprise the format MCC-MNC-GID. The service identifier may comprise the format MCC-MNC. The service identifier may comprise a format that is unrelated to the MCC, MNC, or GID. A first SIM card storing an IMSI 311480123456789 and/or a second SIM card comprising an IMSI 311481123456789 may store a service identifier 311480 or 311481. A SIM card storing an IMSI 311480123456789 and a GID BA01450000000000 may store a service identifier 311480BA01450000000000.

Figure 2:
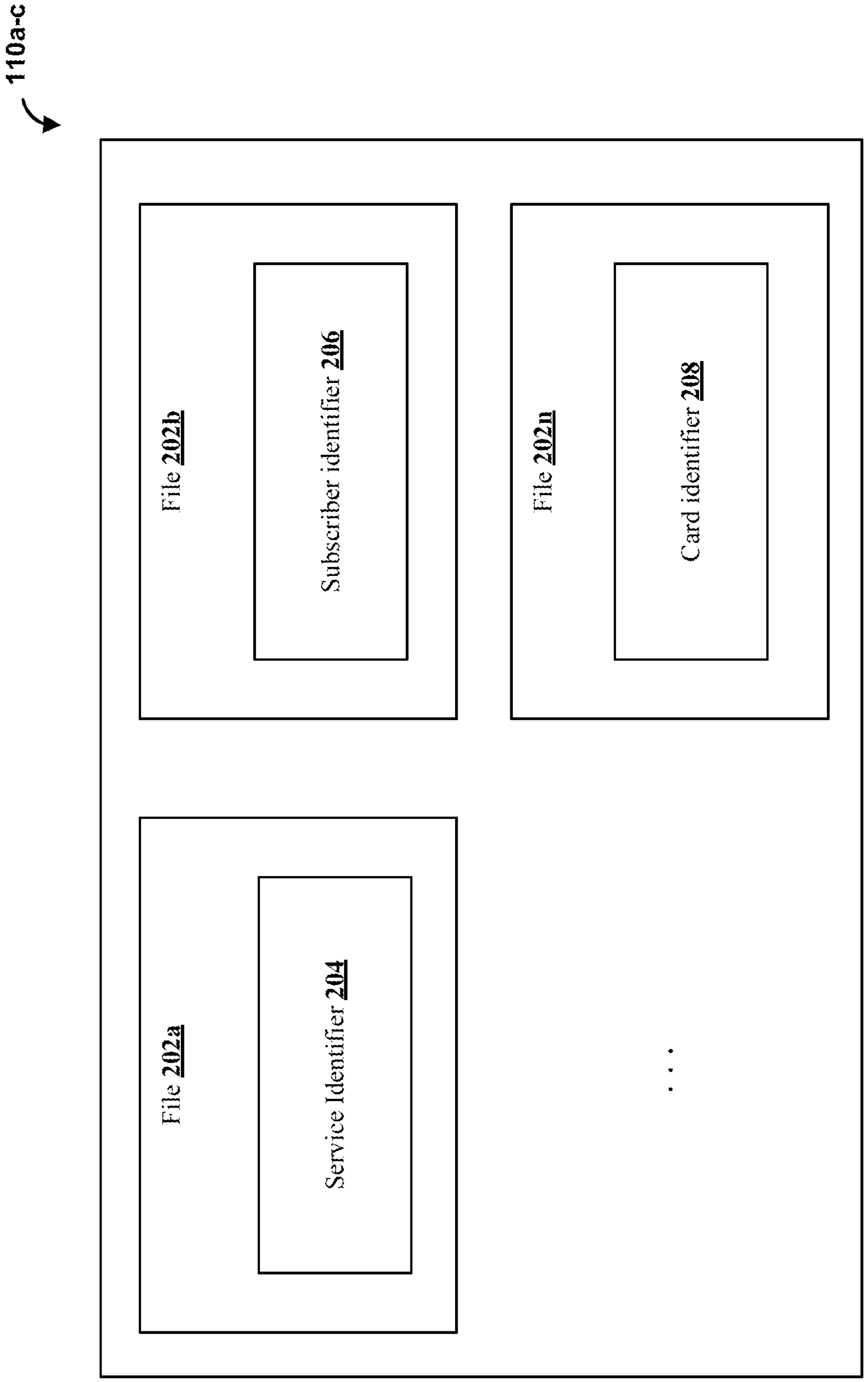
FIG. 2 shows an example of a subscriber identity module (SIM) card.

FIG. 2 shows an example SIM card. The example SIM card may be any of the SIM cards 110*a-c*. The SIM card may comprise a plurality of files 202*a-n*. The plurality of files 202*a-n* may comprise any quantity of files. Each of the files 202*a-n* may store one or more credentials. The plurality of files 202*a-n* may comprise a first file 202*a*. The first file 202*a* may store a service identifier 204. The service identifier 204 may be associated with the service entity associated with the SIM card. The plurality of files 202*a-n* may comprise a second file 202*b*. The second file 202*b* may store a subscriber identifier (e.g., an international mobile subscriber identifier (IMSI)). The IMSI may comprise a 15-digit number. The first three digits of the 15-digit number may represent the MCC. The MCC may be followed by the MNC. The remaining digits of the 15-digit number may represent the MSIN. The third file 202*n* may store a card identifier (e.g., an integrated circuit card identifier (ICCID)) 208. Other files 202*c-m* may store any other credentials, such as a group identifier (GID) identifying the second network 104 on the first network 102, cryptographic keys needed for authentication and access to the first network 102 via the base station(s) 103*a-n*, etc.

Referring back to FIG. 1, all of the SIM cards associated with the same service entity may store the same service identifier associated with the service entity irrespective of the MCC-MNC combination(s) present in the IMSI. As described above, if the IMSIs with a specific MCC-MNC combination (e.g., 311480) are exhausted, the MNO may begin generating IMSIs with the next MCC-MNC combination (e.g., 311481) that is allocated by regulatory bodies. Both the SIM cards storing the old MCC-MNC combination (e.g., 311480) and the SIM cards storing the new MCC-MNC combination (e.g., 311481) may store the same service identifier.

Figure 3:
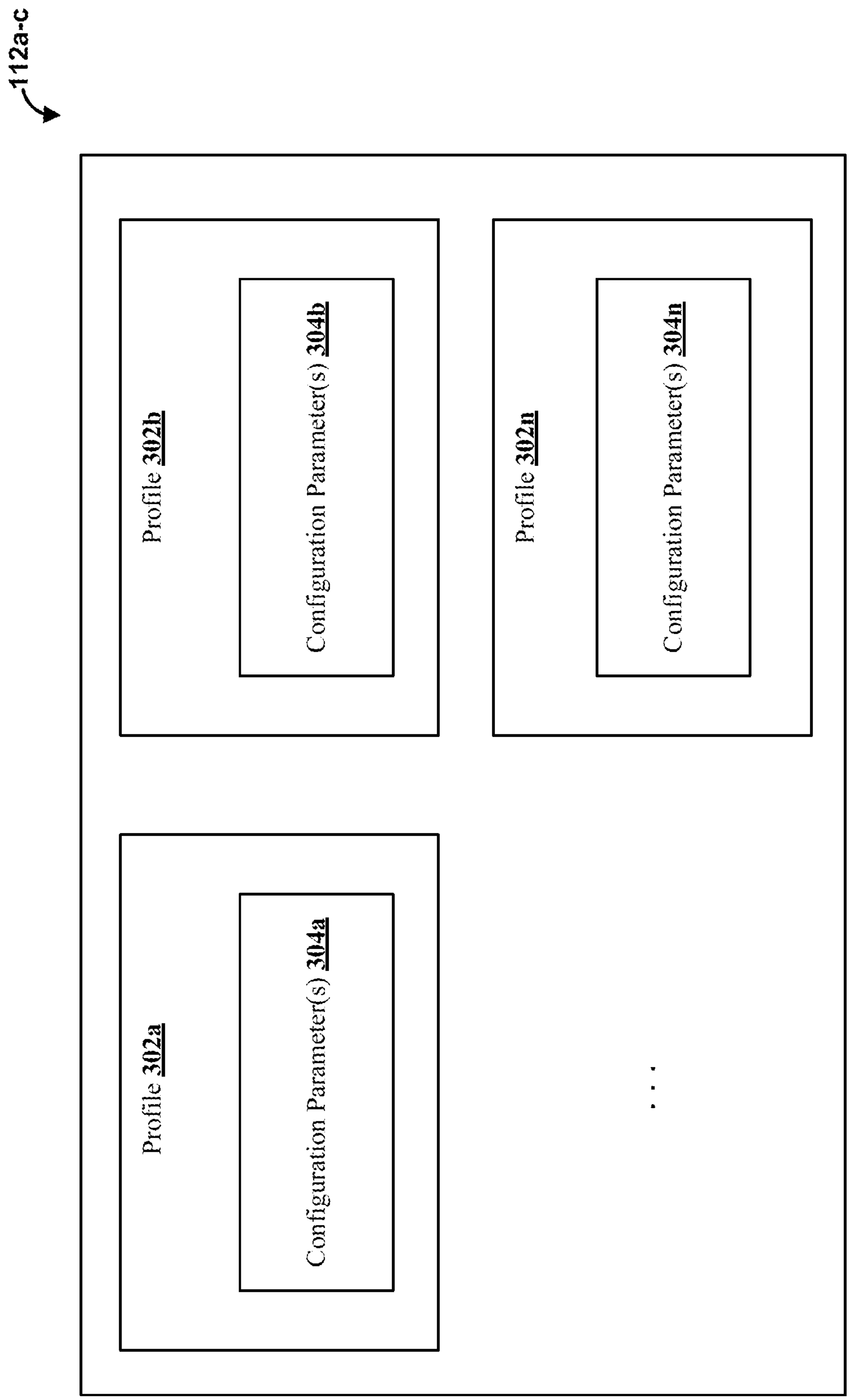
FIG. 3 shows an example user device storage.

The user devices 108*a-c* may each comprise a storage 112*a-c*. Each storage 112 a-c may store a plurality of profiles. Each of the plurality of profiles may correspond to a particular service entity. FIG. 3 shows an example storage. The example storage may comprise any of the storages 112*a-c*. The storage may comprise a plurality of profiles. The plurality of profiles may comprise a first profile 302*a*. The first profile 302*a* may correspond to a first service entity (e.g., a first MNO or MVNO). The plurality of profiles may comprise a second profile 302*b*. The second profile 302*b* may correspond to a second service entity (e.g., a second MNO or MVNO). The plurality of profiles may comprise a third profile 302*n*. The third profile 302*n* may correspond to a third service entity (e.g., a third MNO or MVNO). The plurality of profiles 302*a-n* may comprise any quantity of profiles. The OEM(s) that manufactured the user devices 108*a-c* may have caused the plurality of profiles 302*a-n* to be stored in the storage, such as at the time of manufacture.

Each of the plurality of profiles 302*a-n* may comprise one or more configuration parameters (e.g., settings). The first profile 302*a* may comprise configuration parameter(s) 304*a*. The configuration parameter(s) 304*a* may be associated with a communication service of the first service entity. The second profile 302*b* may comprise configuration parameter (s) 304*b*. The configuration parameter(s) 304*b* may be associated with a communication service of the second service entity. The third profile 302*n* may comprise configuration parameter(s) 304*n*. The configuration parameter(s) 304*n* may be associated with a communication service of the third service entity.

Figure 4:
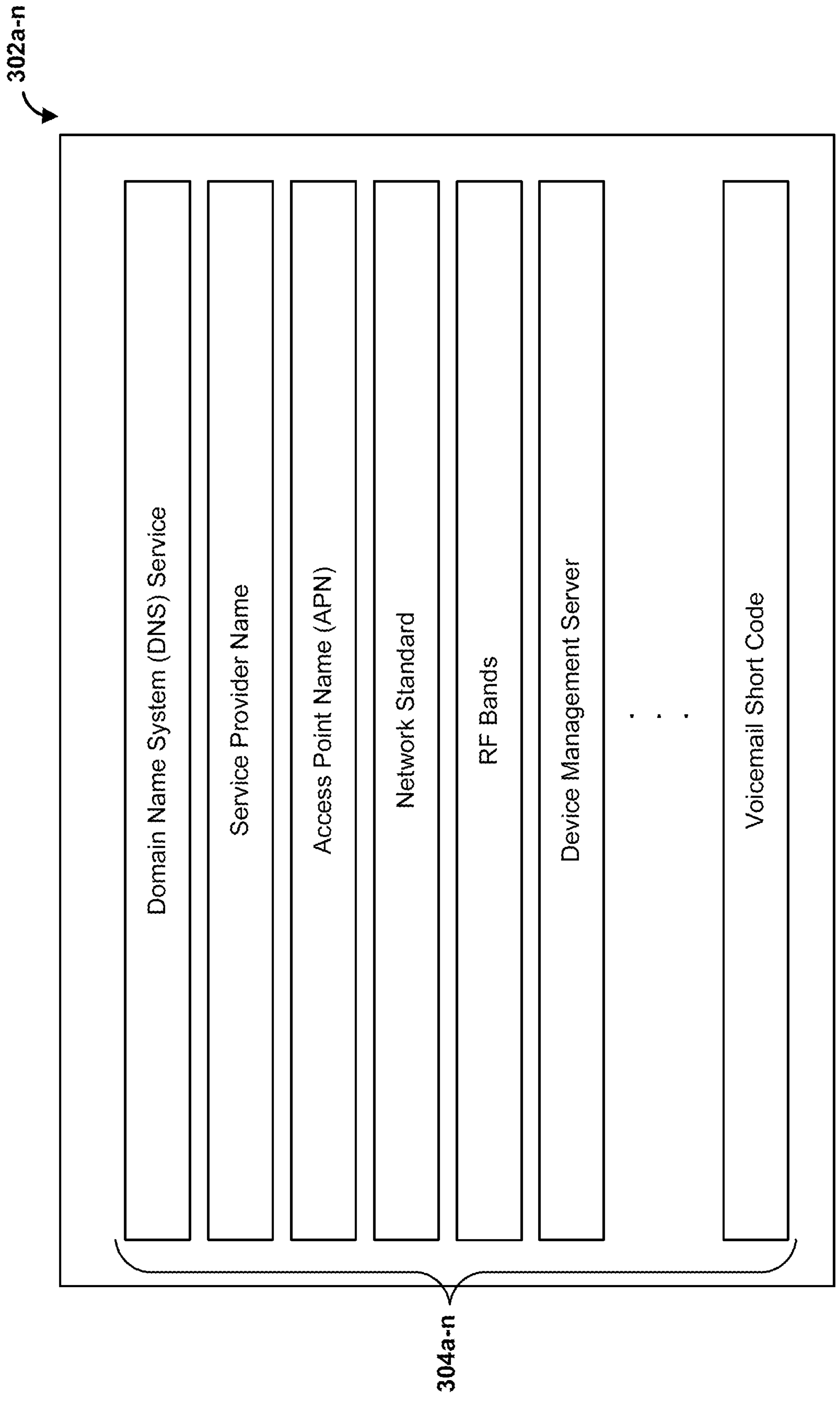
FIG. 4 shows an example profile.

FIG. 4 shows an example profile. The profile may be any of the profiles 302*a-n*. The configuration parameter(s) 304*a-n* may comprise a domain name system (DNS) server for the user devices 108*a-c* to connect to. The DNS server may translate human readable domain names to machine readable IP addresses. The configuration parameter(s) 304*a-n* may comprise a service entity name (e.g., the MINO name) to display on an interface of the user devices 108*a-c*, such as on a lock screen, on a settings screen, and/or in a notification bar. The configuration parameter(s) 304*a-n* may comprise an access point name (APN). The APN may indicate a gateway for the user devices 108*a-c* to connect to for cellular data connectivity. The configuration parameter (s) 304*a-n* may comprise a standard of the first network 102. The standard of the first network 102 may indicate, for example, whether the first network 102 uses 4G or 5G technology. The configuration parameter(s) 304*a-n* may comprise one or more frequency bands supported by the first network 102. The configuration parameter(s) 304*a-n* may comprise an address of a device management server (DMS) for the user devices 108*a-c* to connect to for management of the user devices 108*a-c*. The DMS may facilitate the user devices 108*a-c* turning on a mobile hotspot, for example. The configuration parameter(s) 304*a-n* may comprise a voicemail short code. The voicemail short code may indicate a short messaging service (SMS) number from which the user devices 108*a-c* receive voicemail notifications.

The user devices 108*a-c* may be configured to determine (e.g., access, read) the IMSI stored on the respective SIM card. The user devices 108*a-c* may determine the IMSI based on accessing the second file on the respective SIM card. Based on determining the IMSI, the user devices 108*a-c* determine the MCC-MNC combination associated with the IMSI. The MCC-MNC combination may comprise the first five or six digits of the IMSI.

The user devices 108*a-c* may be configured to determine if a profile in the corresponding storage 112*a-c* matches (e.g., corresponds to) the MCC-MNC combination. If a profile in the corresponding storage 112*a-c* matches the MCC-MNC combination, the user devices 108*a-c* may be configured to establish a connection with the first network 102. The user devices 108*a-c* may establish the connection with the first network 102 based on one or more configuration parameter(s) stored in the profile corresponding to the MCC-MNC combination. To cause a connection to be established between the user devices 108*a-c* and the first network 102, the user devices 108*a-c* may send the IMSI to the first network 102. If the user devices 108*a-c* are connected to the first network 102, the user devices 108*a-c* may utilize the infrastructure provided by the first network 102 to communicate with other user devices.

However, a profile matching the MCC-MNC combination may not exist in the corresponding storage 112*a-c*. If a profile matching the MCC-MNC combination does not exist in the corresponding storage 112*a-c*, the user devices 108*a-c* may be unable to (e.g., fail to) identify a profile matching the MCC-MNC in the corresponding storage 112*a-c*. Thus, the user devices 108*a-c* may be unable to connect to the first network 102 using the MCC-MNC combination.

The user devices 108*a-c* may be configured to determine (e.g., access, read) the particular service identifier stored in the corresponding SIM card. The user devices 108*a-c* may be configured to determine the service identifier stored in the respective SIM card based on determining that a profile matching the MCC-MNC combination does not exist in the corresponding storage 112*a-c*. However, it should be appreciated that the user devices 108*a-c* may be configured to determine the service identifier without first attempting to determine if a profile in the corresponding storage 112*a-c* matches (e.g., corresponds to) the MCC-MNC combination (e.g., a user device may determine the service identifier without first determining the IMSI or its MCC-MNC combination). The user devices 108*a-c* may determine the service identifier based on accessing the first file on the respective SIM card. The user devices 108*a-c* may determine the service identifier stored on the respective SIM card without accessing the IMSI stored in the second file on the respective SIM card.

The user devices 108*a-c* may be configured to determine (e.g., identify) a profile in the corresponding storage 112*a-c* that matches (e.g., corresponds to) the service identifier. The determined profile may correspond to the service entity associated with the service identifier. The profile determined by the user devices 108*a-b* may correspond to the service entity (e.g., first network 102) associated with the service identifier stored on the SIM cards 110*a-b*. The profile determined by the user device 108*c* may correspond to the service entity (e.g., second network 104) associated with the service identifier stored on the SIM card 110*c*. To determine the profile, the user devices 108*a-b* may access the storage 112*a-b*.

Each of user devices 108*a-c* may be configured to establish a connection with the first network 102. The user devices 108*a-c* may establish the connection with the first network 102 based on the configuration parameter(s) stored in the profile corresponding to the service entity. The user devices 108*a-b* may establish the connection with the first network 102 based on the configuration parameter(s) stored in the profile corresponding to the first network 102. The user device 108*c* may establish the connection with the first network 102 based on the configuration parameter(s) stored in the profile corresponding to the first network 102. To cause a connection to be established between the user devices 108*a-c* and the first network 102, the user devices 108*a-c* may send the IMSI to the first network 102. If the user devices 108*a-c* are connected to the first network 102, the user devices 108*a-c* may utilize the infrastructure provided by the first network 102 to communicate with other user devices.

One or more of the user devices 108*a-c* may comprise the plurality of profiles corresponding to various service entities in the storage 112*a-c*. If a user device comprises the plurality of profiles corresponding to various service entities in the storage 112*a-c*, the user device may be able to utilize a service identifier stored on the corresponding SIM card to connect to the first network 102 (e.g., the user device may be compatible with the service identifier). However, one or more of the user devices 108*a-c* may comprise a SIM card that does not comprise the service identifier. The SIM card may not comprise the first file comprising the service identifier. The SIM card may not comprise the service identifier if the SIM card is older than the corresponding one of the user devices 108*a-c* (e.g., manufactured before the corresponding one of the user devices 108*a-c*).

Any of the SIM cards 110*a-c* that do not comprise the service identifier may be updated. The SIM cards 110*a-c* that do not comprise the service identifier may be updated to store the first file comprising the service identifier. Updating the SIM cards 110*a-c* to store the first file may comprise performing (e.g., using) an over-the-air (OTA) update process. The OTA process may be initiated by a service entity based on the service entity obtaining a service identifier for the first time.

The OTA update process may comprise the service entity sending (e.g., pushing out) a notification indicating the update to the SIM card(s) 110*a-c* associated with the service entity. The SIM card(s) 110*a-c* associated with the service entity may not comprise the service identifier. An OTA server 106 associated with the first network 102 may send the notification indicating the update to the SIM cards 110*a-b*. An OTA server 108 associated with the second network 104 may send the notification indicating the update to the SIM card 110*c*. The service entity (e.g., the OTA server 106 or the OTA server 108) may send the notification indicating the update out via SMS or hypertext transfer protocol (HTTP) link.

The user devices 108*a-c* may receive the notification indicating the update. The notification indicating the update may be received via SMS notification or via a HTTP link. The SMS notification may be a class 0 SMS. The notification indicating the update may be received at a server modem on the user devices 108*a-c*. The notification indicating the update may not be sent to or received by a messaging application (SMS application) on the user devices 108*a-c*. The notification indicating the update may not be displayed to the user via an interface of the user devices 108*a-c*. The SIM cards 110*a-c* may receive the notification indicating the update. The SIM cards 110*a-c* may comprise an OTA application. The OTA application may be running on the SIM cards 110*a-c*. The OTA application may receive the notification indicating the update. The user devices 108*a-c* (e.g., the OTA application) may determine that an update is available for the SIM cards 110*a-c* based on receiving the notification indicating the update.

If any of the user devices 108*a-c* (e.g., the OTA application) determine that an update is available for the corresponding SIM card, the user device (e.g., the OTA application) may retrieve (e.g., receive) the update from the service entity (e.g., the OTA server 106 or the OTA server 108). The service entity may send the update to the user device (e.g., the OTA application). The update may comprise the service identifier. The service identifier received by a particular user device may correspond to the service entity that sent the notification indicating the update to that user device. The update may comprise a first file comprising the service identifier.

The user devices 108*a-c* (e.g., the OTA application) may cause the service identifier to be stored in a first file on the SIM cards 110*a-c*. The first file comprising the service identifier may be stored on the user devices 108*a-c* based on the user devices 108*a-c* being restarted (e.g., powered off and powered back on). The IMSI may be stored in a second file on the SIM cards 110*a-c*. The service identifier may be different from the IMSI.

If the user devices 108*a-c* cause the service identifier to be stored on the SIM cards 110*a-c*, the user devices 108*a-c* may be configured to utilize the service identifier to connect to the first network 102. The user devices 108*a-c* may be configured to determine (e.g., identify) a profile in the corresponding storage 112*a-c* that matches (e.g., corresponds to) the service identifier. The determined profile may correspond to the service entity associated with the service identifier. The profile determined by the user devices 108*a-b* may correspond to the service entity (e.g., first network 102) associated with the service identifier stored on the SIM cards 110*a-b*. The profile determined by the user device 108*c* may correspond to the service entity (e.g., second network 104) associated with the service identifier stored on the SIM card 110*c*. To determine the profile, the user devices 108*a-b* may access the storage 112*a-b*.

Each of user devices 108*a-c* may be configured to establish a connection with the first network 102. The user devices 108*a-c* may establish the connection with the first network 102 based on the configuration parameter(s) stored in the profile corresponding to the service entity. The user devices 108*a-b* may establish the connection with the first network 102 based on the configuration parameter(s) stored in the profile corresponding to the first network 102. The user device 108*c* may establish the connection with the first network 102 based on the configuration parameter(s) stored in the profile corresponding to the first network 102. To cause a connection to be established between any of the user devices 108*a-c* and the first network 102, the user device may send the IMSI to the first network 102. If the user devices 108*a-c* are connected to the first network 102, the user devices 108*a-c* may utilize the infrastructure provided by the first network 102 to communicate with other user devices.

Figure 5:
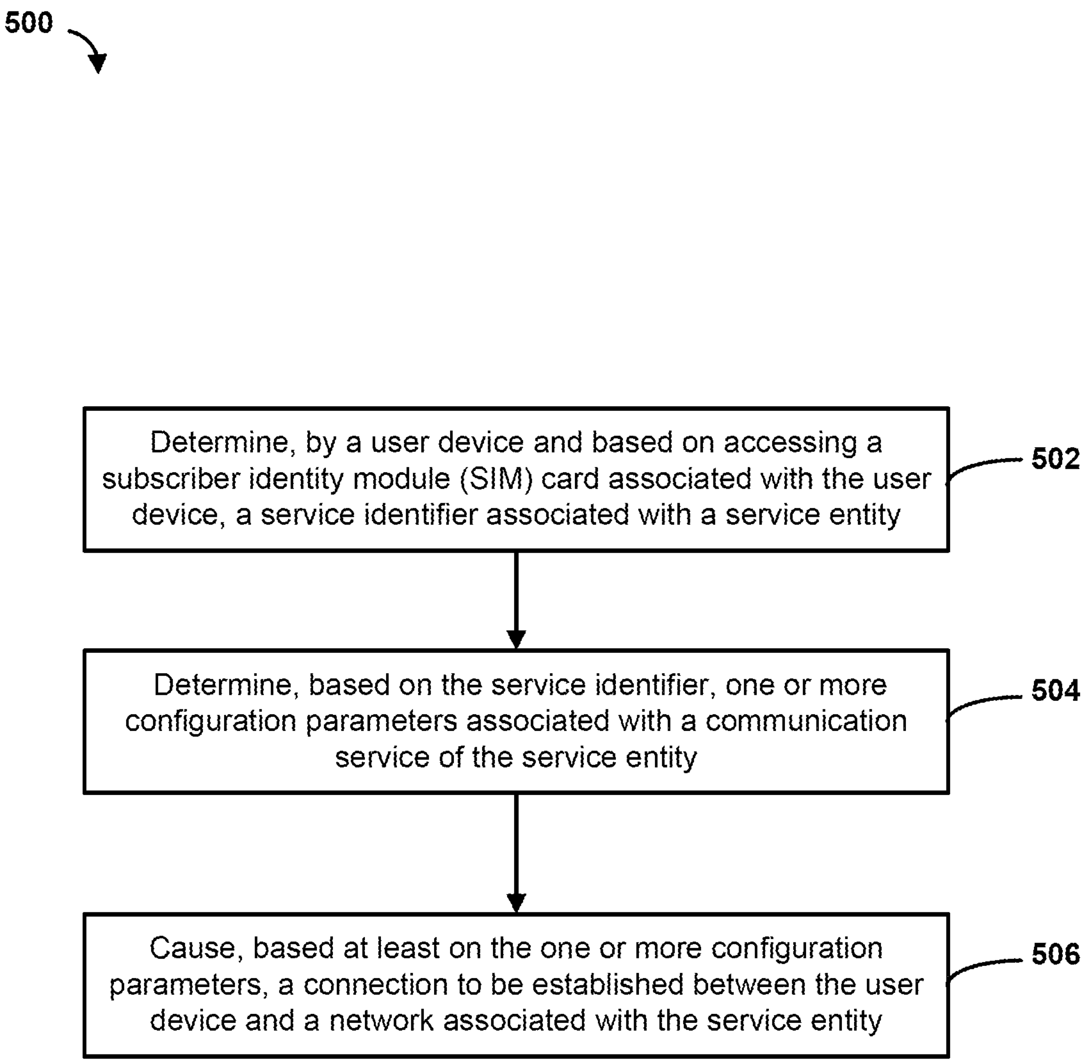
FIG. 5 shows a flowchart of an example method.

FIG. 5 is a flow diagram illustrating an example method. The method 500 may comprise a computer implemented method for establishing connections between user devices and a network. A system and/or computing environment, such as the system 100 of FIG. 1 and/or the computing environment of FIG. 10, may be configured to perform the method 500. For example, one or more of the user devices 108*a-c* of FIG. 1 may be configured to perform the method 500.

At 502, a service identifier associated with a service entity may be determined. The service identifier may be determined by a user device. The service identifier may be determined based on accessing a SIM card associated with the user device. The SIM card may comprise an eSIM or a physical SIM card. The service identifier may be stored in a first file on the SIM card. The service identifier may be different from an IMSI stored on the SIM card. The IMSI may be stored in a second file on the SIM card. The service identifier may be determined without accessing the IMSI.

At 504, one or more configuration parameters may be determined. The one or more configuration parameters may be determined based on the service identifier. The one or more configuration parameters may be associated with a communication service (e.g., network service, wireless network service, cellular service) of the service entity. Determining the one or more configuration parameters associated with the communication service of the service entity may comprise identifying a profile. The profile may be stored on the user device. The profile may correspond to the service entity.

The profile may comprise the configuration parameter(s) associated with the communication service of the service entity. The configuration parameter(s) may comprise at least one of a domain name system server for the user device to connect to, a service entity name to display on an interface of the user device, a gateway for the user device to connect to for internet access, a network standard, one or more frequency bands supported by the network, an address of a device management server for the user device to connect to for management of the user device, or a voicemail short code indicating a short messaging service number from which the user device receives voicemail notifications.

At 506, a connection may be caused to be established. The connection may be between the user device and a network associated with the service entity. The connection may be caused to be established based at least on the one or more configuration parameters. To cause the connection to be established, the user device may send the IMSI to the network. If the user device is connected to the network, the user device may utilize the infrastructure provided by the network to communicate with other user devices.

To connect to a network associated with a service entity, a user device may default to determining a service identifier stored on a SIM card of the user device. The user device may determine the service identifier stored on the SIM card without first determining the IMSI stored on the SIM card. The user device may determine the service identifier based on accessing a first file comprising the service identifier on the SIM card. The user device may determine the service identifier stored in the first file without accessing the IMSI stored in a second file on the SIM card. The user device may load a profile corresponding to the determined service identifier. The profile may comprise one or more configuration parameters associated with a communication service of the service entity. The user device may utilize the configuration parameter(s) to establish a connection with the network associated with the service entity.

Figure 6:
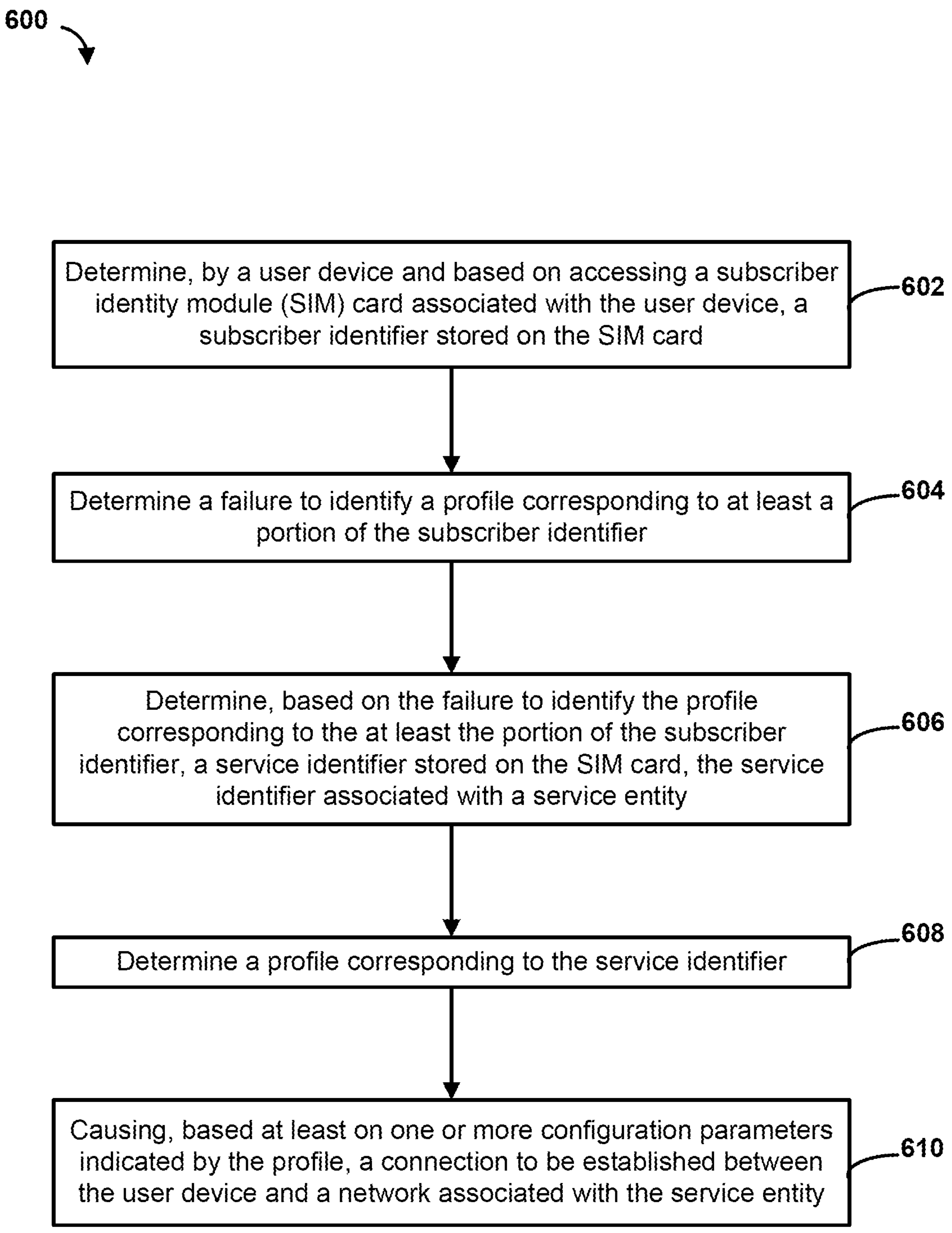
FIG. 6 shows a flowchart of an example method.

FIG. 6 is a flow diagram illustrating an example method. The method 600 may comprise a computer implemented method for establishing connections between user devices and a network. A system and/or computing environment, such as the system 100 of FIG. 1 and/or the computing environment of FIG. 10, may be configured to perform the method 600. For example, one or more of the user devices 108*a-c* of FIG. 1 may be configured to perform the method 600.

At 602, an IMSI may be determined. The IMSI may be determined by a user device. The IMSI may be determined based on accessing a SIM card associated with the user device. The IMSI may be stored on the SIM card. The IMSI may be determined based on accessing a second file on the SIM card. An MCC-MNC combination associated with the IMSI may be determined based on determining the IMSI. The MCC-MNC combination may comprise the first five or six digits of the IMSI.

It may be determined if a profile matching (e.g., corresponding to) the MCC-MNC combination exists in a storage of the user device. If a profile in the storage matches the MCC-MNC combination, a connection may be caused to be established. The connection may be between the user device and a network associated with the IMSI. The connection may be caused to be established based at least on one or more configuration parameters indicated by the profile matching the MCC-MNC combination.

However, a profile matching the MCC-MNC combination may not exist in the storage of the user device. At 604, a failure to identify a profile corresponding to at least a portion of the IMSI may be determined. If a profile matching the MCC-MNC combination does not exist in the storage of the user device, the user device may be unable to (e.g., fail to) identify a profile matching the MCC-MNC in the storage. Thus, the user device may be unable to connect to the network using the MCC-MNC combination.

At 606, a service identifier may be determined. The service identifier may be associated with a service entity. The service identifier may be stored on the SIM card. The service identifier may be stored in a first file on the SIM card. The service identifier may be determined based on the failure to identify the profile corresponding to the at least the portion of the IMSI. The service identifier may be determined by a user device. The service identifier may be determined based on accessing the first file on the SIM card. The service identifier may be different from the IMSI stored on the SIM card. The service identifier may be determined without accessing the IMSI, such as without accessing the second file on the SIM card.

One or more configuration parameters may be associated with a communication service of the service entity. The one or more configuration parameters may be retrieved based on the service identifier. Additionally, or alternatively, the one or more configuration parameters may be retrieved based on a profile. At 608, a profile may be determined. The profile may correspond to the service identifier. The profile may correspond to the service entity associated with the service identifier. The profile may be stored on the user device. The profile may comprise one or more configuration parameters. The one or more configuration parameters may be associated with a communication service of the service entity.

The configuration parameter(s) may comprise at least one of a domain name system server for the user device to connect to, a service entity name to display on an interface of the user device, a gateway for the user device to connect to for internet access, a network standard, one or more frequency bands supported by the network, an address of a device management server for the user device to connect to for management of the user device, or a voicemail short code indicating a short messaging service number from which the user device receives voicemail notifications.

At 610, a connection may be caused to be established. The connection may be between the user device and a network associated with the service entity. The connection may be caused to be established based at least on one or more configuration parameters indicated by the profile. To cause the connection to be established, the user device may send the IMSI to the network. If the user device is connected to the network, the user device may utilize the infrastructure provided by the network to communicate with other user devices.

To connect to a network associated with a service entity, a user device may default to determining an IMSI stored on a SIM card of the user device. If the user device determines that a profile corresponding to the determined IMSI is stored on the user device, the user device may utilize the profile corresponding to the determined IMSI to establish a connection with the network associated with the service entity. If the user device determines that a profile corresponding to the determined IMSI is not stored on the user device, the user device may determine a service identifier stored on the SIM card. The user device may utilize a profile corresponding to the determined service identifier to establish a connection with the network associated with the service entity.

Figure 7:
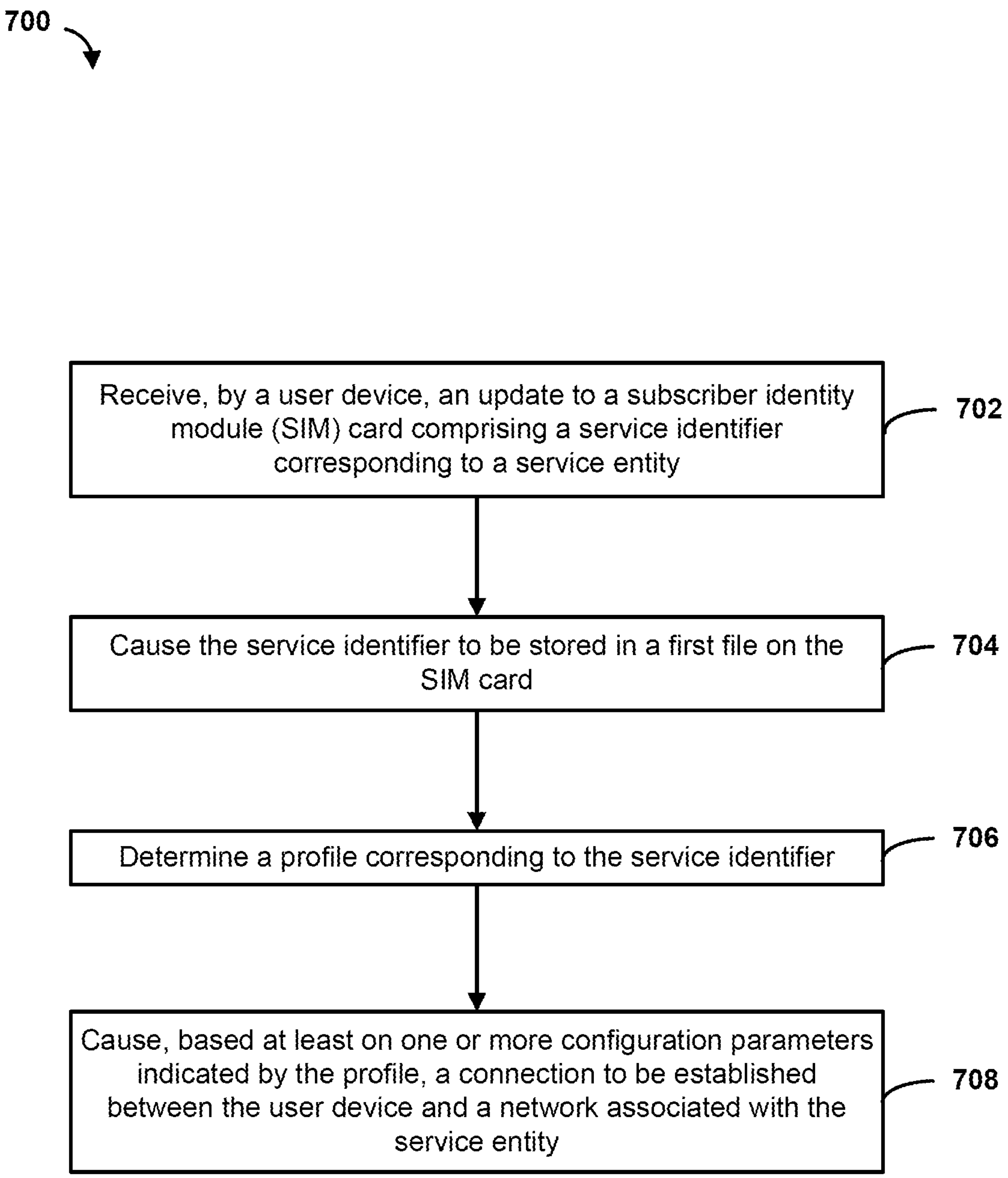
FIG. 7 shows a flowchart of an example method.

FIG. 7 is a flow diagram illustrating an example method. The method 700 may comprise a computer implemented method for establishing connections between user devices and a network. A system and/or computing environment, such as the system 100 of FIG. 1 and/or the computing environment of FIG. 10, may be configured to perform the method 700. For example, one or more of the user devices 108*a-c* of FIG. 1 may be configured to perform the method 700.

A SIM card may not comprise a service identifier. If a SIM card does not comprise a service identifier, the SIM Card may be updated. Updating the SIM card may comprise performing (e.g., using) an OTA update process. The OTA process may be initiated by a service entity based on the service entity obtaining a service identifier for the first time. The OTA update process may comprise the service entity sending (e.g., pushing out) a notification indicating the update to the SIM card(s) associated with the service entity. The service entity (e.g., a server associated with the service entity) may send the notification indicating the update out via SMS or hypertext transfer protocol (HTTP) link.

The user device comprising a SIM card may receive the notification indicating the update. The notification indicating the update may be received via SMS notification or via a HTTP link. The notification indicating the update may be received at a server modem on the user device. The SIM card may receive the notification indicating the update. The SIM card may comprise an OTA application. The OTA application may be running on the SIM card. The OTA application may receive the notification indicating the update. The user device (e.g., the OTA application) may determine that an update is available for the SIM card based on receiving the notification indicating the update.

If the user device (e.g., the OTA application) determines that an update is available for the SIM card, the user device (e.g., the OTA application) may retrieve (e.g., receive) the update from the service entity (e.g., from the server associated with the service entity). At 702, an update to the SIM card may be received. The update may be received by a user device. The update may comprise a service identifier corresponding to the service entity. The update may comprise a first file comprising the service identifier.

At 704, the service identifier may be caused to be stored on the SIM card. The service identifier may be caused to be stored in a first file on the SIM card. The service identifier may be caused to be stored on the SIM card based on the user device being restarted (e.g., powered off and powered back on). The IMSI may be stored in a second file on the SIM card. The service identifier may be different from the IMSI.

At 706, a profile may be determined. The profile may correspond to the service identifier. The profile may correspond to the service entity associated with the service identifier. The profile may be stored on the user device. The profile may comprise one or more configuration parameters. The one or more configuration parameters may be associated with a communication service of the service entity. The configuration parameter(s) may comprise at least one of a domain name system server for the user device to connect to, a service entity name to display on an interface of the user device, a gateway for the user device to connect to for internet access, a network standard, one or more frequency bands supported by the network, an address of a device management server for the user device to connect to for management of the user device, or a voicemail short code indicating a short messaging service number from which the user device receives voicemail notifications.

At 708, a connection may be caused to be established. The connection may be between the user device and a network associated with the service entity. The connection may be caused to be established based at least on one or more configuration parameters indicated by the profile. To cause the connection to be established, the user device may send the IMSI to the network. If the user device is connected to the network, the user device may utilize the infrastructure provided by the network to communicate with other user devices.

A service entity may obtain (e.g., become associated with) a service identifier. The service entity may have previously been unassociated with a service identifier. The service entity may push a notification indicating an update to all SIM cards associated with the service entity or a subset of SIM cards associated with the service entity. The SIM cards associated with the service entity may receive the notification indicating the update. Based on receiving the notification indicating the update, the SIM cards may retrieve the update from a server associated with the service entity. The update may comprise a new file (e.g., first file) comprising the service identifier. The new file may be stored on the SIM cards.

Figure 8:
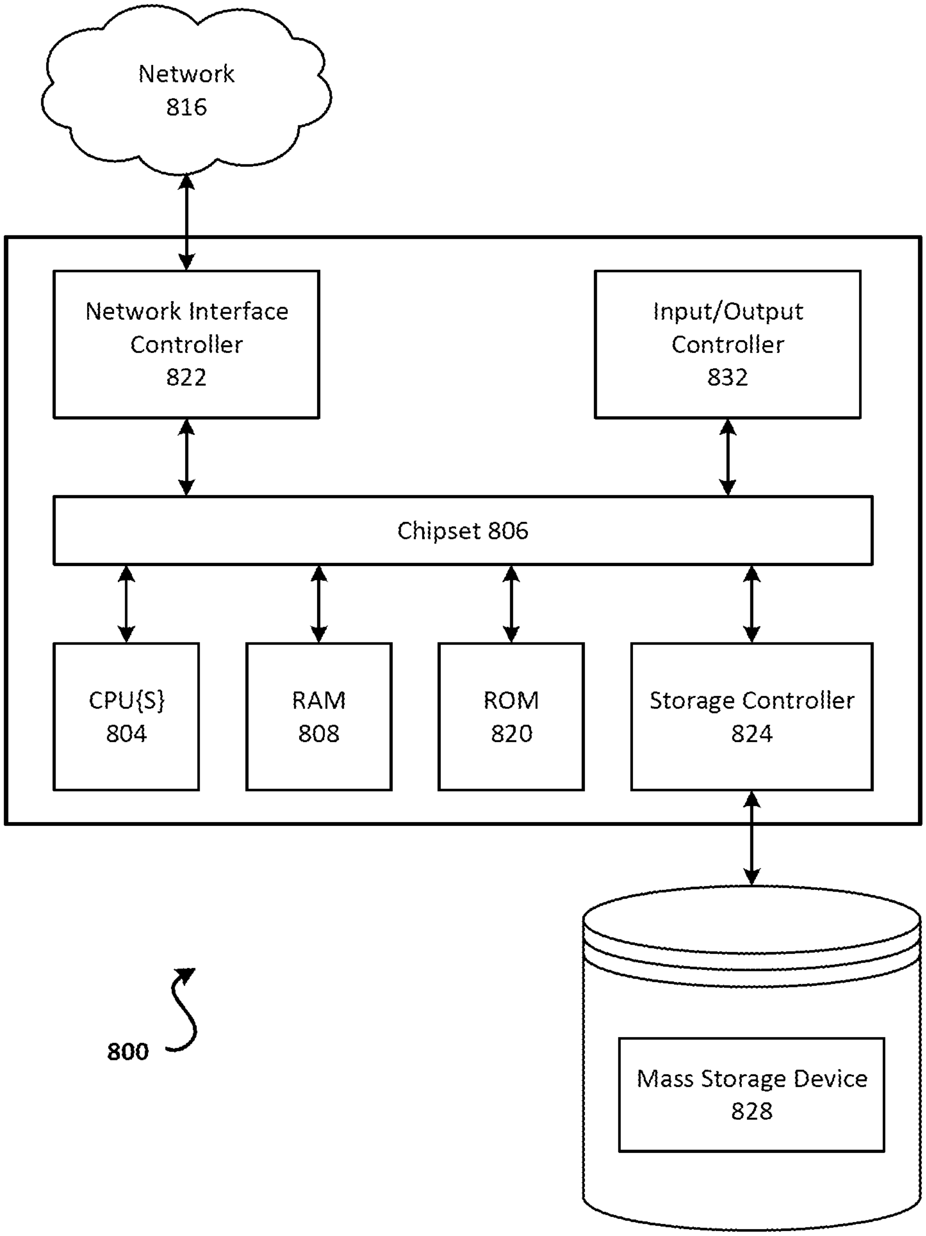
FIG. 8 is a block diagram illustrating an example computing device.

FIG. 8 depicts a computing device that may be used in various aspects, such as the servers and/or devices depicted in FIG. 1. With regard to the example architecture of FIG. 1, the server device 102, the gateway device 104, the computing device 106, the one or more user devices 117, and/or the audio sources 110 may each be implemented in an instance of a computing device 800 of FIG. 8.

The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 5, FIG. 6, and FIG. 7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 605. The GPU(s) 605 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 6, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device

800 may have access to computer-readable storage media storing computer-executable instructions, which, when executed by the computing device 800, may perform the methods described in relation to FIG. 5, FIG. 6, and FIG. 7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
- determining, by a user device and based on accessing a subscriber identity module (SIM) card associated with the user device, an international mobile subscriber identity (IMSI) stored on the SIM card;
- determining a failure to identify a profile corresponding to at least a portion of the IMSI;
- determining, based on the failure to identify the profile corresponding to the at least the portion of the IMSI, and without using the IMSI, a plurality of configuration parameters corresponding to a service identifier stored on the SIM card, wherein the service identifier comprises an identifier of a service entity; and
- causing, based at least on the plurality of configuration parameters, a connection to be established between the user device and a network associated with the service entity.

2. The method of claim 1, wherein the IMSI is stored in a first file on the SIM card and the service identifier is stored in a second file on the SIM card.

3. The method of claim 1, wherein a profile corresponding to the service identifier is stored on the user device, and wherein the profile corresponding to the service identifier comprises the plurality of configuration parameters.

4. The method of claim 1, wherein the plurality of configuration parameters comprise at least one of:
- a domain name system server for the user device to connect to;
- a name of the service entity to display on an interface of the user device;
- a gateway for the user device to connect to for internet access;
- a standard of the network;
- one or more frequency bands supported by the network;
- an address of a device management server for the user device to connect to for management of the user device; and
- a voicemail short code indicating a short messaging service number from which the user device receives voicemail notifications.

5. The method of claim 1, wherein causing, the connection to be established between the user device and the network associated with the service entity comprises sending the IMSI to the network.

6. The method of claim 1, wherein the service identifier is different from the IMSI.

7. A method comprising:
- receiving, by a user device, an update to a subscriber identity module (SIM) card comprising a service identifier, wherein the service identifier comprises an identifier of a service entity;
- causing the service identifier to be stored in a first file on the SIM card;
- determining, without using an international mobile subscriber identity (IMSI) stored on the SIM card, a plurality of configuration parameters corresponding to the service identifier; and
- causing, based at least on the plurality of configuration parameters corresponding to the service identifier, a connection to be established between the user device and a network associated with the service entity.

8. The method of claim 7, further comprising receiving, at a server modem of the user device, at least one of a short messaging service (SMS) notification indicating the update to the SIM card or a Hypertext Transfer Protocol (HTTP) link indicating the update to the SIM card.

9. The method of claim 7, wherein profile corresponding to the service identifier is stored on the user device, and wherein the profile corresponding to the service identifier comprises the plurality of configuration parameters.

10. The method of claim 7, wherein the plurality of configuration parameters comprise at least one of:
- a domain name system server for the user device to connect to;
- a name of the service entity to display on an interface of the user device;
- a gateway for the user device to connect to for internet access;
- a standard of the network;
- one or more frequency bands supported by the network;
- an address of a device management server for the user device to connect to for management of the user device; and
- a voicemail short code indicating a short messaging service number from which the user device receives voicemail notifications.

11. The method of claim 7, wherein causing the connection to be established between the user device and the network associated with the service entity comprises sending the IMSI to the network.

12. The method of claim 7, wherein the IMSI is stored in a second file on the SIM card.

13. The method of claim 7, wherein the service identifier is different from the IMSI.

14. A method comprising:

determining, by a user device and based on accessing a subscriber identity module (SIM) card associated with the user device, a service identifier comprising an identifier of a service entity, wherein the service identifier is different from an international mobile subscriber identity (IMSI) stored on the SIM card;

determining, based on the service identifier and without using the IMSI, one or more configuration parameters associated with a communication service of the service entity; and causing, based at least on the plurality of configuration parameters, a connection to be established between the user device and a network associated with the service entity.

15. The method of claim 14, wherein determining the plurality of configuration parameters associated with the communication service of the service entity comprises identifying a profile stored on the user device, wherein the profile corresponds to the service entity and comprises the plurality of configuration parameters.

16. The method of claim 14, wherein the IMSI is configured to be used to establish a connection between the user device and the network associated with the service entity.

17. The method of claim 14, wherein causing the connection to be established between the user device and the network associated with the service entity comprises sending the IMSI to the network.

18. The method of claim 1, wherein the service identifier is stored in a first file on the SIM card and the IMSI is stored in a second file on the SIM card.

* * * * *